United States Patent
Williams, Jr. et al.

[11] Patent Number: 5,921,144
[45] Date of Patent: Jul. 13, 1999

[54] BRAKE PEDAL ASSEMBLY WITH DISPLACEMENT LIMITER

[75] Inventors: John M. Williams, Jr., Royal Oak; Scott A. Esposito, Rochester Hills; Paul H. Stoloff; Rahul V. Auradkar, both of Farmington Hills; Richard A. Kleinhoffer, Sterling Heights, all of Mich.

[73] Assignee: Chrysler Corporation, Auburn Hills, Mich.

[21] Appl. No.: 08/927,783

[22] Filed: Sep. 11, 1997

[51] Int. Cl.$^6$ .............................. G05G 1/14; B60D 1/28
[52] U.S. Cl. .................. 74/512; 74/560; 180/271
[58] Field of Search .............. 74/512, 560, 539, 74/542, 513; 180/271

[56] References Cited

U.S. PATENT DOCUMENTS 4,875,385 10/1989 Sitrin .......................................... 74/512
5,615,749 4/1997 Kato .......................................... 180/274
5,848,662 12/1998 Sakaue .................................. 74/512 X

FOREIGN PATENT DOCUMENTS 0 719 697 A1  7/1996  European Pat. Off. .

*Primary Examiner*—John A. Jeffery
*Assistant Examiner*—Brandon C. Stallman
*Attorney, Agent, or Firm*—Lawrence J. Shruupoff

[57] ABSTRACT

A brake pedal assembly for applying the brakes of an automotive vehicle comprises an elongated brake lever pivotally mounted on a bracket at a point adjacent the upper end of the brake lever permitting swinging movement of the lower end of the lever forwardly to a brake-applying position and rearwardly to a brake-release position. The brake lever has a head on the upper end and a pedal on the lower end. A brake lever displacement limiter comprises a tie-bar mounted on the bracket to provide an abutment positioned to be struck by the head of the lever to block rearward movement of the lower end of the lever beyond the brake-release position.

5 Claims, 4 Drawing Sheets

BRAKE PEDAL ASSEMBLY WITH DISPLACEMENT LIMITER

FIELD OF INVENTION

This invention relates generally to a brake pedal assembly for applying the brakes of an automotive vehicle, and more particularly to a brake pedal assembly constructed to limit displacement of the brake pedal lever on frontal impact.

BACKGROUND OF THE INVENTION

On impact, when a motor vehicle is involved in a front end collision, the valve body of the brake booster tends to push the brake pedal lever rearwardly and upwardly far beyond the normal brake release position. The foot and leg of the driver may be severely injured when this happens. What is needed is a brake pedal assembly which will prevent such excessive retraction of the brake pedal lever.

SUMMARY OF THE INVENTION

In accordance with the present invention, a brake pedal assembly is provided comprising a brake lever pivoted on a mounting bracket for normal pivotal movement in opposite directions between a brake applying position and a brake release position. A brake lever displacement limiter is provided comprising an abutment positioned to be struck by the brake lever to block it from moving beyond the brake release position.

Further in accordance with the invention, the brake lever has a head on the upper end. A tie-bar on the bracket provides an abutment positioned to be struck by the head of the brake lever to block rearward movement of the lower end of brake lever beyond the brake release position, thereby protecting the driver from injury in a frontal impact.

More specifically, the brake booster has a valve body provided with a push rod pivoted to the brake lever. The push rod is preferably located beneath the tie-bar and the tie-bar is located beneath the head of the brake lever. Accordingly, when the brake lever swings beyond the normal brake release position, it strikes the tie-bar with a downward impact. Should the tie-bar be torn away from the bracket by this downward impact the tie-bar will strike the push rod, causing the valve body to fail at this point. Such failure of the valve body causes the brake lever to become disconnected from the booster which is desirable to prevent the excessive rearward swinging of the brake lever.

One object of this invention is to provide a brake pedal assembly with displacement limiter having the foregoing features and capabilities.

Another object is to provide a brake pedal assembly with displacement limiter which is composed of a relatively few simple parts, is easy and inexpensive to manufacture and assemble, and is highly effective in the performance of its intended function.

These and other objects, features and advantages of the invention will become more apparent as the following description proceeds, especially when considered with the accompanying drawings.

DETAILED DESCRIPTION OF THE PREFERRED EMBODIMENT

Referring now more particularly to the drawings, there is shown a brake pedal assembly 10 located in front of the driver's seat in a motor vehicle 12 in a position to be operated by the foot of the driver. The brake pedal assembly 10 comprises a bracket 14 and an elongated brake lever 16 pivoted to the bracket.

Figure 1:
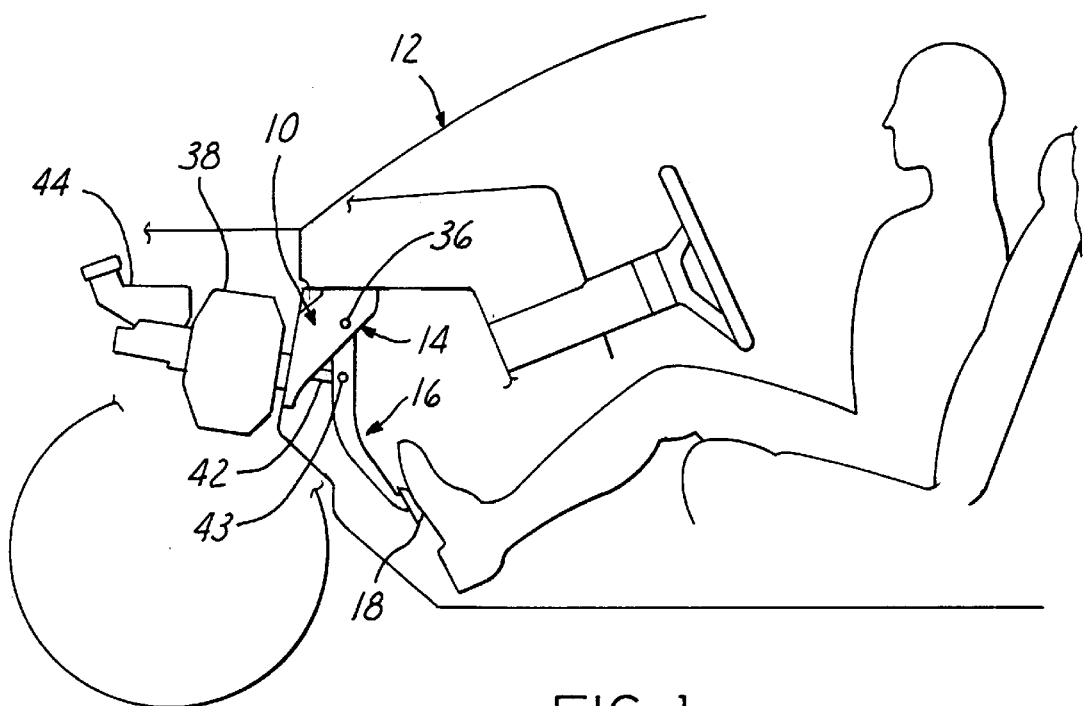
FIG. 1 is a semi-diagrammatic view showing an automotive vehicle having a brake pedal assembly embodying this invention.
Figure 2:
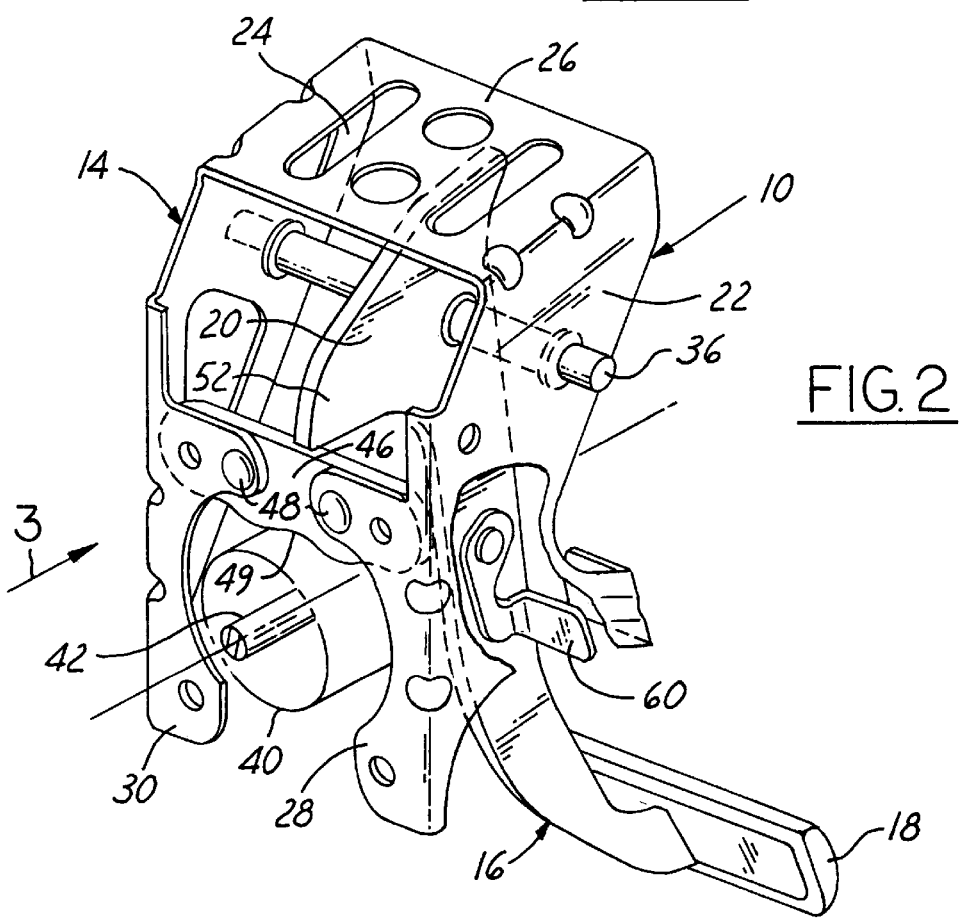
FIG. 2 is a perspective view of the brake pedal assembly.
Figure 3:
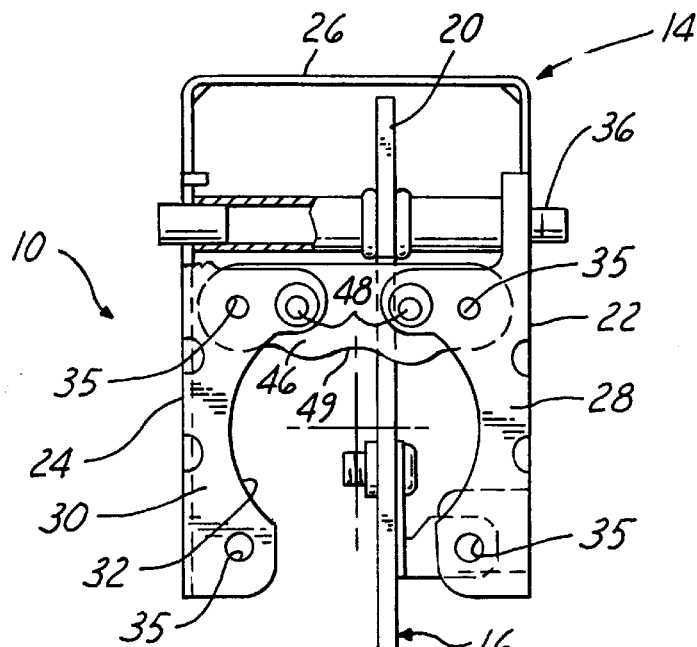
FIG. 3 is a view taken in the direction of the arrow 3 in FIG. 2.
Figure 4:
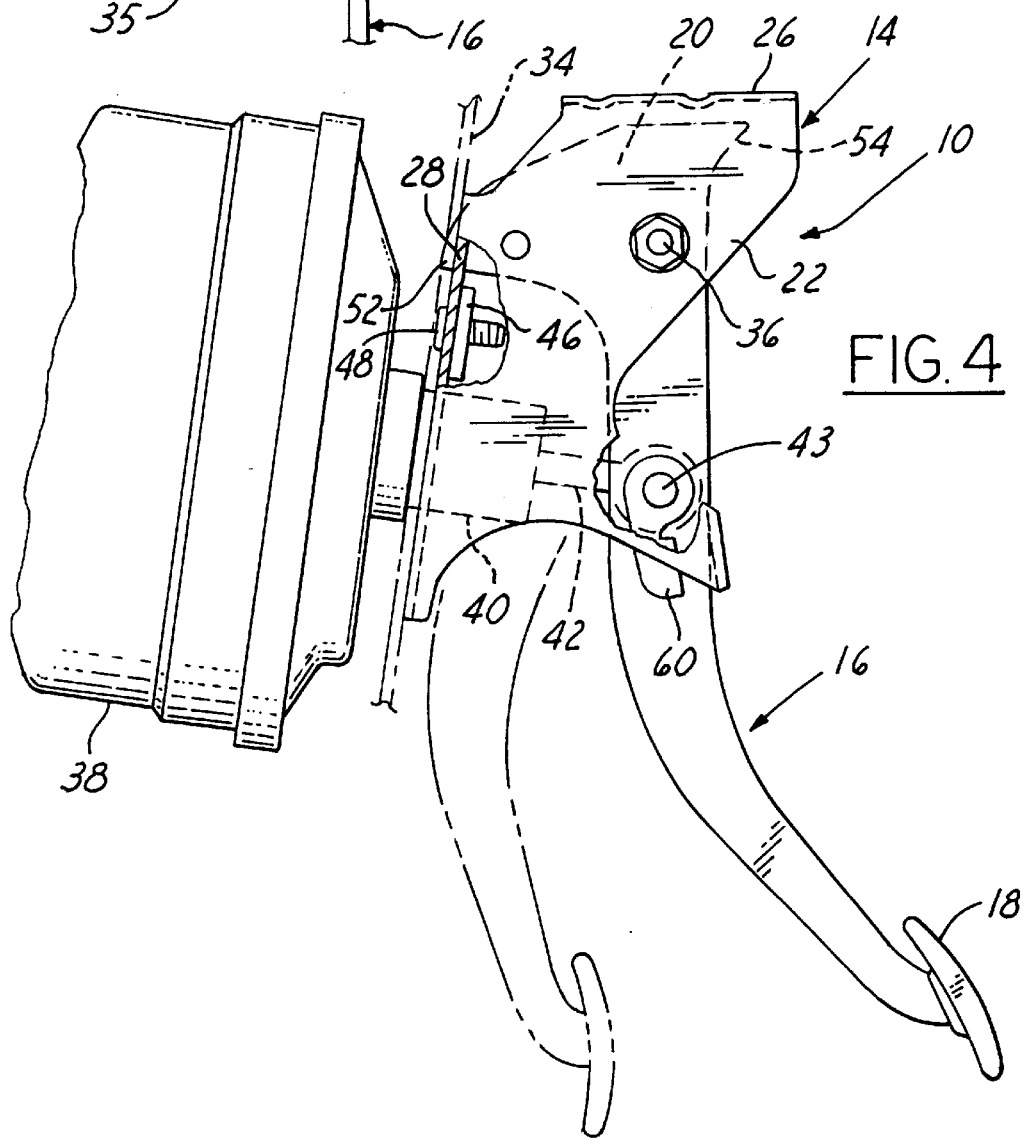
FIG. 4 is a fragmentary side elevational view of the brake pedal assembly and a portion of a booster, showing the brake pedal lever in solid lines in the brake release position and in broken lines in the applied position.

The brake lever is shown in its normal, generally vertical release position in FIGS. 1 and 2 and in solid lines in FIG. 4. A pedal 18 is secured to the lower end of the brake lever. The brake lever has an integral head 20 on its upper end.

The bracket 14 has laterally spaced side walls 22 and 24 and a horizontal top wall 26 integrally connected to the upper edges of the side walls. The front vertical edges of the side walls 22 and 24 have laterally inwardly extending, coplanar vertical mounting flanges 28 and 30 which together define a center opening 32. The bracket 14 is rigidly secured to vehicle support structure 34 by fasteners extending through holes 35 in the flanges 28 and 30.

The brake lever 16 is pivoted adjacent its upper end to the side walls 22 and 24 on a horizontal pivot pin 36 which extends perpendicular to the longitudinal centerline of the vehicle. The brake lever 16 is capable of being pivoted from the normal release position shown in solid lines in FIG. 4 clockwise or forwardly to a brake-applying position shown in broken lines by foot pressure on the pedal 18.

A booster 38 mounted on the vehicle support structure 34 forwardly of bracket 14 has a cylindrical valve body 40 which extends through the opening 32 between the flanges 28 and 30. The valve body 40 is provided with a generally horizontal push rod 42, one end of which is pivoted at 43 to the brake lever 16 between the pivot pin 36 and the pedal 18. Attached to the booster is a master cylinder 44 for applying the brakes. The booster and master cylinder are of conventional construction.

A brake lever displacement limiter in the form of a horizontal tie-bar 46 extends between the upper ends of the flanges 26 and 28 of bracket 16, having its opposite ends secured thereto by suitable fasteners 48. The lower edge 49 of the tie-bar is concave to clear the valve body 40.

The head 20 of the brake lever 16 has a forward projection 52 which in the normal release position of the lever is disposed in closely spaced relation above the upper edge of the tie-bar 46 (see FIG. 4), so that the tie-bar does not interfere with the normal retraction of the brake lever to its release position. In the release position of the brake lever 16, a rearward projection 54 of the head 20 is disposed in closely spaced relation beneath the top wall 26 of the bracket.

A stop light switch striker 60 is provided on the brake lever to illuminate a stop light when the brake lever is pivoted in a brake-applying direction away from the brake-release position.

Figure 5:
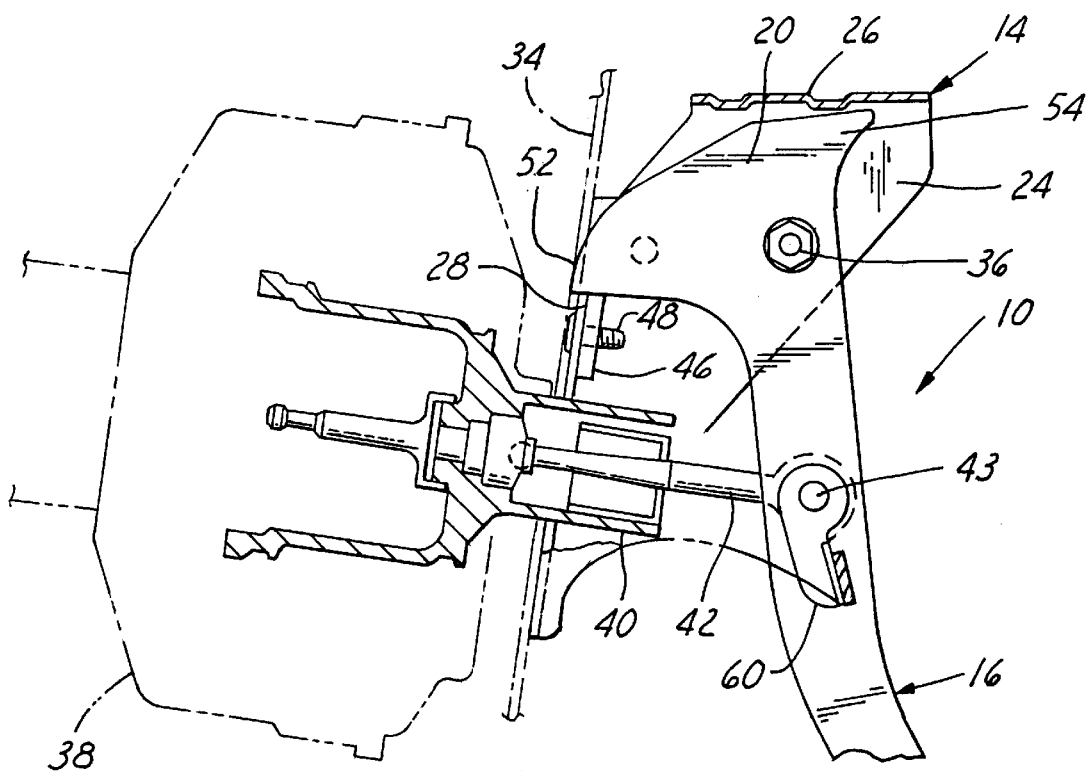
FIG. 5 is a fragmentary side elevational view showing the brake pedal lever retracted slightly beyond the normal brake-release position and the front of the head of the lever contacting the tie-bar to block further retraction of the brake lever.

In the event of a frontal collision, the impact, if of sufficient severity, will cause the push rod 42 of the valve body 40 of the booster 38 to be thrust rearwardly against the brake lever 16, causing the brake lever to swing violently counterclockwise in FIG. 4 beyond its normal release position. If the lever 16 is not prevented from such excessive retraction movement, the lever 16 and pedal 18 can severely injure the foot or leg of the driver. To prevent this, the forward projection 52 on the head 20 of the lever strikes the tie-bar 46 which provides an abutment to block further retraction of the lever and prevents any significant rearward swinging of the lever beyond the brake release position. See FIG. 5.

Figure 6:
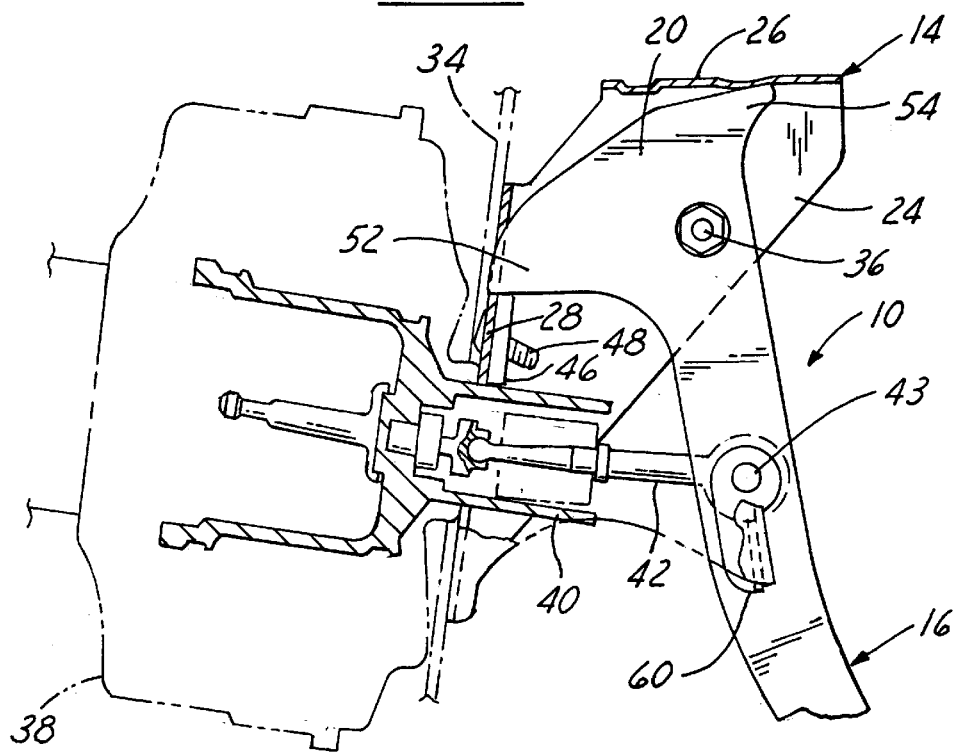
FIG. 6 is a view similar to FIG. 5 but showing the brake pedal further retracted in which the tie-bar has broken away from the mounting bracket.
Figure 7:
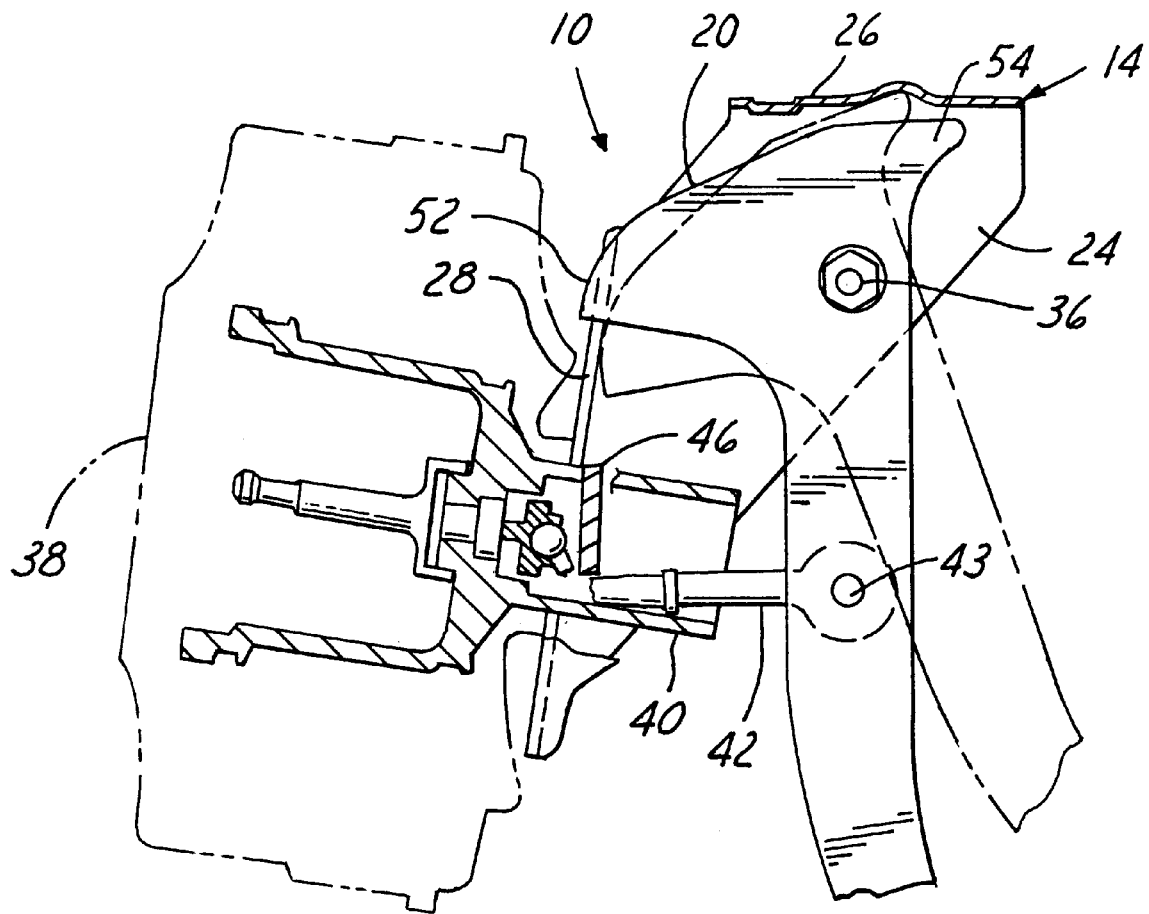
FIG. 7 is a view similar to FIG. 6 but showing the brake pedal still further retracted, and the rear of the head of the brake lever contacting the top wall of the bracket.

If the impact is sufficiently violent to cause the tie-bar 46 to break away from the bracket 14 when struck by the projection 52 on the head 20 of the brake lever, the tie-bar will be forced downwardly and since the push rod 42 of the booster 38 is directly beneath the tie-bar, the tie-bar will often sever the push rod and thus disconnect the lever from the valve body which is desirable in preventing further retraction movement of the brake lever. See FIGS. 6 and 7. If the brake lever 16 should retract beyond the position where the head 20 of the lever contacts the tie-bar, as when the tie-bar breaks loose, the second projection 54 on the head of the lever strikes the top wall 26 of the bracket. The top wall 26 provides a second abutment blocking excessive reverse swinging of the brake pedal (FIG. 7).

What is claimed is:

1. A brake pedal assembly for applying the brakes of an automotive vehicle comprising a mounting bracket, an elongated brake lever having an upper end and a lower end, a pedal on the lower end of the brake lever, a head on the upper end of the brake lever, means pivotally connecting said brake lever to said bracket at a point adjacent the upper end of the brake lever permitting movement of the lower end of the lever forwardly to a brake-applying position and rearwardly to a brake-release position, lever displacement limiting means comprising a tie-bar mounted on said bracket providing a first abutment positioned to be struck by the head of said lever to block rearward movement of the lower end of said lever beyond the brake-release position, a brake booster provided with a valve body having a push rod pivoted to said brake lever, said push rod being located beneath said tie-bar, said tie-bar being located beneath said head in a position to receive a downward impact when struck by said head, whereby, should the tie-bar be torn away from said bracket and driven downwardly by the downward impact of said head the tie-bar will strike the push rod, said bracket having laterally spaced mounting flanges defining an opening clearing said valve body, said tie-bar comprising an elongated horizontal member having ends secured to said respective mounting flanges, said bracket having a second abutment positioned to be struck by said head during rearward movement of the lower end of the lever after the head has struck the tie-bar, said head having a first projection for striking said first abutment and a second projection for striking said second abutment.

2. A brake pedal assembly according to claim 1, wherein said second abutment is an integral portion of said bracket.

3. A brake pedal assembly according to claim 2, wherein said bracket has laterally spaced side walls, said brake lever is disposed between said side walls, said means pivotally connecting said brake lever to said bracket comprises a horizontal pivot pin extending between said side walls, and said bracket has a top wall providing said second abutment.

4. A brake pedal assembly for applying the brakes of an automotive vehicle comprising a mounting bracket, an elongated brake lever having an upper end and a lower end, a pedal on the lower end of the brake lever, a head on the upper end of the brake lever, means pivotally connecting said brake lever to said bracket at a point adjacent the upper end of the brake lever permitting movement of the lower end of the lever forwardly to a brake-applying position and rearwardly to a brake-release position, lever displacement limiting means comprising a tie-bar mounted on said bracket providing a first abutment positioned to be struck by the head of said lever to block rearward movement of the lower end of said lever beyond the brake-release position, said bracket having a second abutment positioned to be struck by said head during rearward movement of the lower end of the lever beyond the brake-release position, said head having a first projection for striking said first abutment and a second projection for striking said second abutment.

5. A brake pedal assembly according to claim 4, wherein said bracket has laterally spaced side walls, said brake lever is disposed between said side walls, said means pivotally connecting said brake lever to said bracket comprises a horizontal pivot pin extending between said side walls, and said bracket has a top wall providing said second abutment.

* * * * *